United States Patent
Park et al.

(10) Patent No.: US 8,054,890 B2
(45) Date of Patent: **\*Nov. 8, 2011**

(54) METHOD FOR ENCODING AND DECODING VIDEO SIGNAL

(75) Inventors: Seung Wook Park, Sungnam-si (KR); Ji Ho Park, Sungnam-si (KR); Byeong Moon Jeon, Sungnam-si (KR)

(73) Assignee: LG Electronics Inc., Seoul (KR)

( * ) Notice: Subject to any disclaimer, the term of this patent is extended or adjusted under 35 U.S.C. 154(b) by 485 days.

This patent is subject to a terminal disclaimer.

(21) Appl. No.: 12/289,563

(22) Filed: Oct. 30, 2008

(65) Prior Publication Data

US 2009/0060050 A1 Mar. 5, 2009

Related U.S. Application Data

(63) Continuation of application No. 11/293,167, filed on Dec. 5, 2005, now abandoned.

(60) Provisional application No. 60/632,994, filed on Dec. 6, 2004.

(30) Foreign Application Priority Data

Jun. 30, 2005 (KR) .................... 10-2005-0057565

(51) Int. Cl.
  *H04N 7/12* (2006.01)
  *H04N 11/02* (2006.01)
  *H04N 11/04* (2006.01)
  *H04B 1/66* (2006.01)

(52) U.S. Cl. .......... 375/240.25; 375/240.16; 375/240; 375/240.01; 375/240.11; 375/240.12

(58) Field of Classification Search ............ 375/240.25, 375/240.16, 240, 240.01, 240.11, 240.12
See application file for complete search history.

(56) References Cited

U.S. PATENT DOCUMENTS

| | | | |
|---|---|---|---|
| 6,148,026 A * | 11/2000 | Puri et al. ................ | 375/240 |
| 6,910,175 B2 | 6/2005 | Krishnamachari | |
| 7,027,512 B2 * | 4/2006 | Jeon .................... | 375/240.16 |
| 7,266,150 B2 | 9/2007 | Demos | |
| 7,733,963 B2 | 6/2010 | Park et al. | |
| 2005/0195900 A1 * | 9/2005 | Han .................... | 375/240.21 |
| 2006/0120450 A1 | 6/2006 | Han et al. | |
| 2008/0165760 A1 | 7/2008 | Challapali et al. | |

FOREIGN PATENT DOCUMENTS

| | | |
|---|---|---|
| KR | 10-2002-0090239 | 11/2002 |
| KR | 10-2004-0047977 | 6/2004 |
| WO | WO 2005/099276 | 10/2005 |

OTHER PUBLICATIONS

Korean Notice of Allowance dated Feb. 23, 2009 with English translation.
Office Action dated Aug. 6, 2010 in corresponding U.S. Appl. No. 11/293,167.
United States Office Action dated Nov. 18, 2009.

\* cited by examiner

*Primary Examiner* — Thai Tran
*Assistant Examiner* — Daquan Zhao
(74) *Attorney, Agent, or Firm* — Harness, Dickey & Pierce, P.L.C.

(57) ABSTRACT

A method and apparatus for decoding a video signal. The video signal being a scalably-encoded video signal corresponding to a base layer and enhanced layer. Various residual signals are determined by comparing, among other things, a corresponding block with the current block. The current block is ultimately decoded using weight information, a reference index and a residual signal.

7 Claims, 4 Drawing Sheets

METHOD FOR ENCODING AND DECODING VIDEO SIGNAL

DOMESTIC PRIORITY INFORMATION

This application claims priority under 35 U.S.C. §119 on U.S. Provisional Application No. 60/632,994, filed on Dec. 6, 2004; the entire contents of which are hereby incorporated by reference.

This is a continuation application of application Ser. No. 11/293,167 filed Dec. 5, 2005, now abandoned the entire contents of which are hereby incorporated by reference.

FOREIGN PRIORITY INFORMATION

This application claims priority under 35 U.S.C. §119 on Korean Patent Application No. 10-2005-0057565, filed on Jun. 30, 2005, the entire contents of which are hereby incorporated by reference.

BACKGROUND OF THE INVENTION

1. Field of the Invention

The present invention relates to a method for encoding and decoding a video signal, and more particularly to a method for encoding a video signal by employing a residual prediction mode and decoding the encoded video data.

2. Description of the Prior Art

It is difficult to allocate a broadband available for TV signals to wirelessly transmitted/received digital video signals wirelessly transmitted/received from/in a portable phone and a notebook computer, which have been extensively used, and a mobile TV and a hand held PC, which are expected to be extensively used in the future. Accordingly, a standard to be used for a video compression scheme for such portable devices must enable a video signal to be compressed with a relatively high efficiency.

In addition, such portable mobile devices are equipped with various processing and presentation capabilities. Accordingly, compressed videos must be variously prepared corresponding to the capabilities of the portable devices. Therefore, the portable devices must be equipped with video data having various qualities obtained through the combination of various parameters including the number of transmission frames per second, resolution, and the number of bits per pixel with respect to one video source, burdening content providers.

For this reason, the content provider prepares compressed video data having a high bit rate with respect to one video source so as to provide the portable devices with the video data by decoding the compressed video and then encoding the decoded video into video data suitable for a video processing capability of the portable devices requesting the video data. However, since the above-described procedure necessarily requires trans-coding (decoding+scaling+encoding), the procedure causes a time delay when providing the video requested by the portable devices. In addition, the transcoding requires complex hardware devices and algorithms due to the variety of a target encoding.

In order to overcome these disadvantages, there is suggested a Scalable Video Codec (SVC) scheme. According to the SVC scheme, a video signal is encoded with a best video quality in such a manner that the video quality can be ensured even though parts of the overall picture sequences (frame sequences intermittently selected from among the overall picture sequences) derived from the encoding are decoded.

A motion compensated temporal filter (or filtering) (MCTF) is an encoding scheme suggested for the SVC scheme. The MCTF scheme requires high compression efficiency, that is, high coding efficiency in order to lower the number of transmitted bits per second because the MCTF scheme is mainly employed under a transmission environment such as mobile communication having a restricted bandwidth.

As described above, although it is possible to ensure video quality even if only a part of the sequence of a picture encoded through the MCTF, which is a kind of the SVC scheme, is received and processed, video quality may be remarkably degraded if a bit rate is lowered. In order to overcome the problem, an additional assistant picture sequence having a low transmission rate, for example, a small-sized video and/or a picture sequence having the smaller number of flames per second may be provided.

The assistant picture sequence is called a base layer, and a main picture sequence is called an enhanced (or enhancement) layer. Since the base layer and the enhanced layer are obtained by encoding the same video contents with different spatial resolution and flame rates, redundancy information exists in video signals of both layers. Accordingly, in order to improve coding efficiency of the enhanced layer, a variety of schemes for predicting the frame of the enhanced layer based on the frame of the base layer have been suggested.

For example, there is a scheme for coding a motion vector of an enhanced layer picture by using a motion vector of a base layer picture temporally simultaneous with the motion vector of the enhanced layer picture. In addition, it is possible to make a prediction video for a video frame of the enhanced layer on the basis of the video frame of the base layer temporally simultaneous with the video frame of the enhanced layer.

In addition, an additional prediction operation may be performed with respect to the prediction video of the enhanced layer created in relation to the main picture sequence by using a prediction video of the base layer created in relation to the assistance picture sequence. This is called a "residual prediction" mode. Herein, the prediction video denotes an image difference value found by performing a prediction operation for a macro block. In other words, the prediction video denotes a video having residual data. Hereinafter, a macro block having a residual data is called a "residual block", and a frame having the residual data is called a "residual frame".

In more detail, a residual block of an enhanced layer is found through a prediction operation for a macro block in a predetermined frame of a main picture sequence, and the prediction operation is performed even for the assistance picture sequence, thereby creating the residual block and the residual frame of the base layer. Thereafter, a residual block of the base layer corresponding to the macro block is found. The residual block of the base layer undergoes up-sampling, so that the size of the residual block of the base layer is enlarged corresponding to the size of the macro block. The pixel values of the enlarged residual block of the base layer are subtracted from the pixel values of the residual block of the enhanced layer, and the resultant value is encoded for the macro block.

FIG. 1 illustrates the conventional residual prediction mode based on a macro block. Herein, an enhanced layer has a frame rate of 30 Hz and frame resolution of CIF. In contrast, a base layer has a frame rate of 15 Hz and frame resolution of QCIF.

A fourth residual block R_MB_4 and a fifth residual block R_MB_5 of the base layer corresponding to a first residual block R_MB_1 and a third residual block R_MB_3 encoded using residual data in the enhanced layer are undergone up-sampling such that the resolution of the residual blocks of the base layer are enhanced to the CIF. Based on the residual blocks of the base layer having the enhanced resolution, the prediction operation for the residual block of the enhanced layer is performed.

However, since a residual block of the base layer corresponding to the second residual block of the enhanced layer R_MB_2 may not exist, it is difficult to find a predicted video based on the residual block of the base layer.

In other words, in order to apply the residual prediction mode, a residual block of the base layer corresponding to a macro block of the enhanced layer must exist. In addition, the residual prediction mode cannot be applied even if a residual frame temporally simultaneous with a frame including a macro block of the enhanced layer does not exist in the base layer.

Accordingly, when the enhanced layer has a flame rate higher than that of the base layer, a frame temporally simultaneous with a flame including a macro block of the enhanced layer to be encoded using residual data or difference values of residual data may not exist in the base layer. Such a frame, which does not exist in the base layer, is called a 'missing picture'. A residual prediction mode cannot be applied to the macro block of the enhanced layer if the base layer has the missing picture. Accordingly, it is difficult to expect the improvement of coding efficiency.

SUMMARY OF THE INVENTION

Accordingly, the present invention has been made to solve the above-mentioned problems occurring in the prior art, and an object of the present invention is to provide a method for encoding a video signal by applying a residual prediction mode for a macro block of an enhanced layer even if a frame temporally simultaneous with a frame of the enhanced layer does not exist in a base layer and a method for decoding the encoded video signal to improve coding efficiency.

To accomplish the above objects, there is provided a method for encoding a video signal, the method comprising the steps of generating a bit stream of a first layer by encoding the video signal through a first predetermined scalable scheme, and generating a bit stream of a second layer by encoding the video signal through a second predetermined scheme, wherein the step of generating the bit stream of the first layer includes a first step of generating a prediction video of a video block using frames selected from frames of the second layer, in which the frames consist of blocks encoded in such a manner that the blocks have residual data corresponding to difference values of pixels between the reference block and the encoded blocks and include a past frame and a future frame with respect to a predetermined frame of the first layer having the video block encoded using residual blocks having the residual data.

The first step comprises the sub-steps of generating an insert block temporally simultaneous with the predetermined frame by using corresponding blocks, which are included in the past frame and the future frame of the second layer and have relative positions identical to a relative position of the video block in a frame, and enlarging a size of the insert block corresponding to a size of the video block if there is no frame in the second layer temporally simultaneous with the predetermined frame, and finding difference values of residual data for the video block by subtracting pixel values of the enlarged insert block from pixel values of the residual block.

The insert block is generated by weighting a first corresponding block in the past frame of the second layer and a second corresponding bock in the future frame of the second layer, respectively.

The method further comprises a step of recording first information on a header of the video block indicating that the video block is encoded using difference values of residual data based on the past frame and the future frame of the second layer.

According to another aspect of the present invention, there is provided a method for encoding a video signal, the method comprising the steps of (1) generating a residual block having residual data, which are difference values of pixels between a video block included in a predetermined frame of the video signal and a reference block for the video block, and (2) generating a prediction video for the video block using a past frame and a future frame of the predetermined frame, the prediction video including blocks encoded in such a manner that the blocks have the residual data.

According to another aspect of the present invention, step (2) includes the steps of (2-1) generating an insert block temporally simultaneous with the predetermined frame by using corresponding blocks, which are included in the past frame and the future flame on the second layer and have relative positions identical to a position of the video block in a frame, and (2-2) finding difference values of residual data for the video block by subtracting pixel values of the insert block from pixel values of the residual block.

According to still another aspect of the present invention, there is provided a method for decoding an encoded video bit stream, the method comprising the steps of decoding a bit stream of a second layer scalably encoded through a second predetermined scheme, and decoding a bit stream of a first layer encoded through the second predetermined scheme using decoding information extracted from the bit stream of the second layer, wherein the step of decoding the bit stream of the first layer includes a first step of restoring a video block, which is included in a predetermined frame of the first layer and encoded using difference values of residual data, such that the video block has original pixel values by using frames, which are a past frame and a future frame with respect to the predetermined frame of the first layer, selected from frames of the second layer and consisting of blocks encoded to have residual data, or by using frames, which are a past frame and a future frame with respect to the predetermined frame of the first layer, selected from frames of the first layer and consisting of blocks encoded to have residual data.

According to yet another aspect of the present invention, there is provided a method for decoding an encoded video bit stream, the method comprising the steps of (1) determining if a video block included in a predetermined frame of the bit stream scalably encoded through a predetermined scheme is encoded using difference values of residual data, and (2) restoring the video block to a block having original pixel values by using a past frame and a future frame of the predetermined frame, the past frame and the future frame including blocks encoded in such a manner that the blocks have residual data when the video block is encoded using difference values of residual data.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
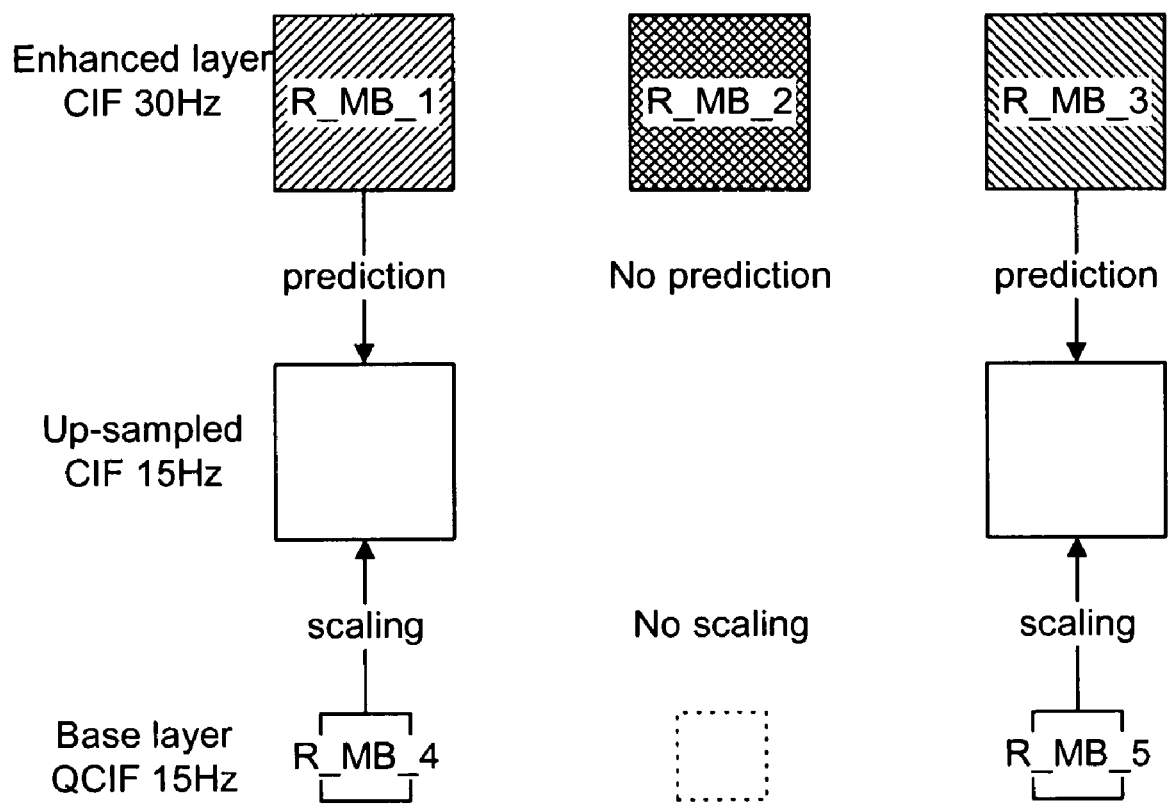
FIG. 1 is a schematic view illustrating the conventional residual prediction mode based on a macro block.

Hereinafter, preferred embodiments of the present invention will be described with reference to the accompanying drawings. In the following description and drawings, the same reference numerals are used to designate the same or similar components, and so repetition of the description on the same or similar components will be omitted.

Figure 2:
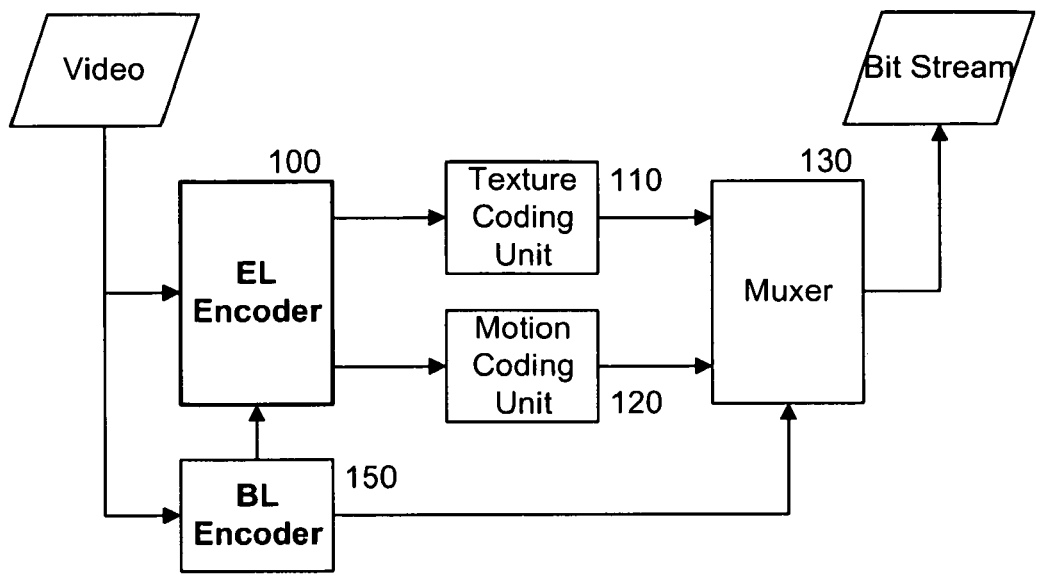
FIG. 2 is a block diagram illustrating the structure of an image signal encoding device employing a scalable coding scheme for a video signal according to an embodiment of the present invention.

FIG. 2 is a block diagram illustrating the structure of a video signal encoding device employing a scalable coding scheme for a video signal according to the present invention.

The video signal encoding device shown in FIG. 2 includes an enhanced layer (EL) encoder 100 for scalably encoding an input video signal based on a macro block through a Motion Compensated Temporal Filter (MCTF) scheme and generating suitable management information, a texture coding unit 110 for converting the encoded data of each macro block into a compressed bit string, a motion coding unit 120 for coding motion vectors of a video block obtained from the EL encoder 100 into a compressed bit string through a specific scheme, a base layer encoder 150 for encoding an input video signal through a predetermined scheme such as the MPEG 1, 2, 4, H.261, or H.264 and generating the sequence of small-sized videos, for example, the sequence of pictures having 25% of an original video size if necessity, a muxer 130 for encapsulating the output data of the texture coding unit 110, the picture sequence of the BL encoder 150, and an output vector data of the motion coding unit 120 in a predetermined format, multiplexing the data with each other in a predetermined format, and then outputting the multiplexed data.

The EL encoder 100 performs a prediction operation for subtracting a reference block obtained through motion estimation from a macro block in a predetermined video frame (or picture) and performs an update operation by adding the image difference between the macro block and the reference block to the reference block. In addition, the EL encoder 100 may additionally perform a residual prediction operation with respect to the macro block representing the image difference with regard to the reference block by using base layer data.

Figure 3:
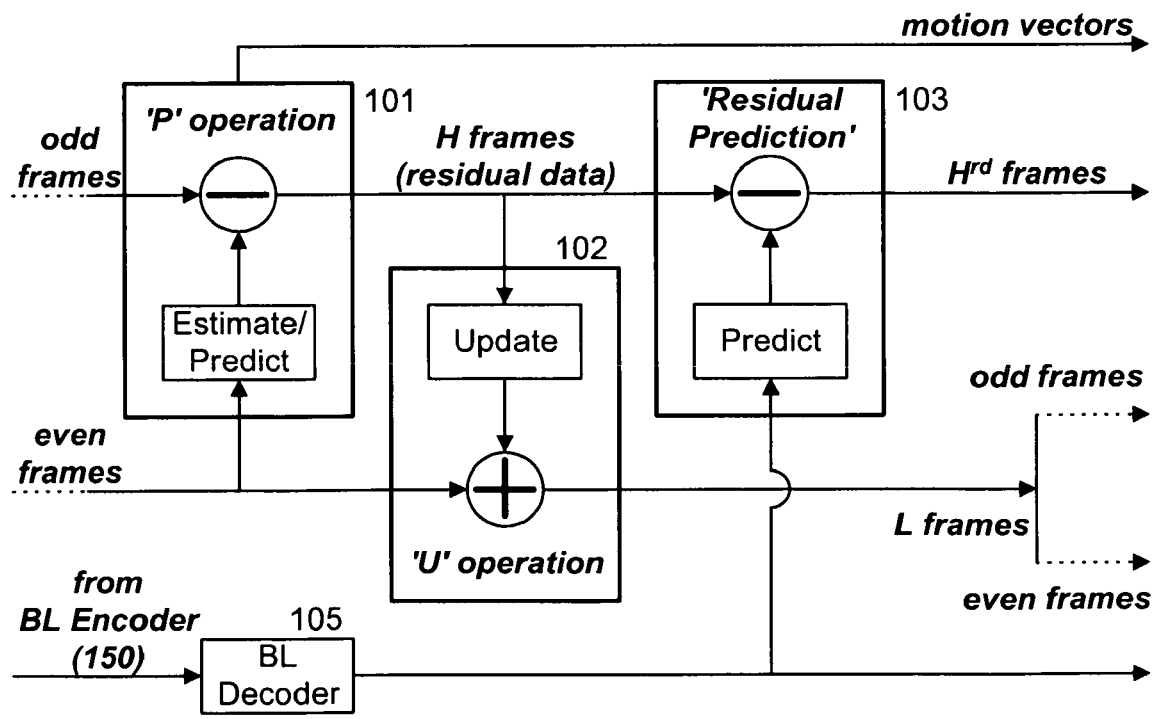
FIG. 3 is a view illustrating temporal decomposition with respect to a video signal in some one temporal decomposition level.

The EL encoder 100 divides the sequence of input video frames into frames, which will have image difference values, and frames, to which the image difference values will be added. For example, the EL encoder 100 divides the input video frames into odd frames and even frames. Then, the EL encoder 100 performs the prediction operation, the update operation, and the residual predication operation with respect to, for example, one group of pictures (GOP) through several levels until the number of L frames (frames generated through the update operation) becomes one. FIG. 3 illustrates the structure relating to the prediction operation, the update operation, and the residual predication operation in one of the above levels.

The structure shown in FIG. 3 includes a BL decoder 105, for extracting encoded information including a frame rate of a base layer stream for the small-sized image sequence encoded in the BL encoder 150 and decoding the base layer stream, an estimation/prediction unit 101 for estimating a reference block for each macro block included in a frame, which may have residual data through motion estimation, that is an odd frame, in even frames provided before or after the odd frame (inter-frame mode) or in its own frame (intra mode) and performing a prediction motion for calculating a motion vector and/or a image difference between the macro block and the reference block (difference values between corresponding pixels), an update unit 102 for performing the update operation through which an image difference calculated with respect to the macro block is normalized and the normalized image difference is added to a corresponding reference block in the adjacent frame (e.g., the even frame) including the reference block for the macro block, and a residual prediction unit 103 for performing an additional prediction operation, that is, a residual prediction operation by using a residual block in the enhanced layer or the base layer corresponding to the residual block having residual data (image difference) generated through the prediction operation of the estimation/prediction unit 101.

The operation performed by the estimation/prediction unit 101 is called a"P" operation, a frame generated through the P operation is called an "H" frame, and residual data existing in the H frame reflects a harmonic component of a video signal. In addition, the operation performed by the update unit 102 is called a 'U' operation, a frame generated through the U operation is called an "L" frame, and the L frame has a low subband picture.

The estimation/prediction unit 101, the update unit 102, and the residual predication unit 103 shown in FIG. 3 can parallely and simultaneously process a plurality of slices divided from one frame instead of a frame unit. In the following description, the term "frame" can be replaced with the "slices" if it does not make technical difference, that is, the frame includes the meaning of the slices.

The estimation/prediction unit 101 divides input video frames or odd frames of L frames obtained through all levels into macro blocks having a predetermined size, searches temporally adjacent even frames in the same temporal decomposition level for blocks having the most similar images to images of divided macro blocks, makes a prediction video of each macro block based on the searched block, and finds a motion vector of the macro block. If a block having correlation above a suitable threshold value is not searched, that is, if a reference block is not searched, encoding is performed in the internal mode with respect to a current macro block using adjacent pixel values.

A block having the highest correlation has the smallest image difference between the block and a target block. The image difference is determined as the sum of pixel-to-pixel difference values or the average of the sum. The smallest macro block (the smallest macro blocks among blocks) having at most a predetermined threshold value is (are) called a reference block (reference blocks).

If the reference block is found, the estimation/prediction unit 101 finds a motion vector to the reference block from the current macro block to be delivered to the motion coding unit 120 and calculates a pixel difference value between each pixel value of the reference block (in a case of one flame) and each pixel value of the current macro block, or a pixel difference value between each pixel average value of the reference block (in a case of plural flames) and the pixel value of the current macro block, thereby encoding a corresponding macro block. In addition, the estimation/prediction unit 101 inserts a relative distance between a frame including the selected reference block and a frame including the current macro block and/or one of reference block modes such as a Skip mode, a DirInv mode, a Bid mode, a Fwd mode, a Bwd mode, and an intra mode into a header field of the corresponding macro block.

The estimation/prediction unit 101 performs the procedure with respect to all macro blocks in a flame, thereby making an H frame which is a prediction video for the flame. In addition, the estimation/prediction unit 101 makes H frames, which are prediction videos for frames, with respect to input video flames or all odd flames of L flames obtained through all levels.

As described above, the update unit 102 adds image difference values for macro blocks in the H flame generated by the estimation/prediction unit 101 to L flames (input video flames or even frames of L flames obtained through all levels) having corresponding reference blocks.

In the meantime, the residual prediction unit 103 searches for a residual block of the base layer corresponding to a residual block (for an enhanced layer) of an H flame (residual flame) having residual data generated in the estimation/prediction unit 101 and enlarging the residual block of the base layer through up-sampling, and subtracts the pixel values of the enlarged residual block of the base layer from the pixel values of the residual block of the enhanced layer, thereby additionally enabling a residual prediction operation.

However, if a residual frame temporally simultaneous with a current frame including a residual block of the enhanced layer does not exist in the base layer output in the BL decoder 105, there is no residual block of the base layer corresponding to the residual block of the enhanced layer.

In this case, the residual prediction unit 103 according to the present invention may perform a residual prediction operation using the residual frame of the enhanced layer or an adjacent residual frame of the base layer.

For example, the residual prediction unit 103 may perform the residual prediction operation based on a past frame and a future frame of a current frame including the residual block of the enhanced layer from among residual frames of the base layer.

In addition, in the case in which there is no the residual block of the base layer corresponding to the residual block of the enhanced layer, the residual prediction unit 103 according to the another embodiment of the present invention may perform the residual prediction operation based on the past frame and the future frame of the current frame including the residual block from among residual frames of the enhanced layer, that is, H frames generated by the estimation/prediction 101.

Hereinafter, embodiments according to the present invention employing a residual estimation mode for the residual block of the enhanced layer when a residual frame temporally simultaneous with the current frame including the residual block of the enhanced layer does not exist in the base layer will be described with reference to FIGS. 4 and 5.

Figure 4:
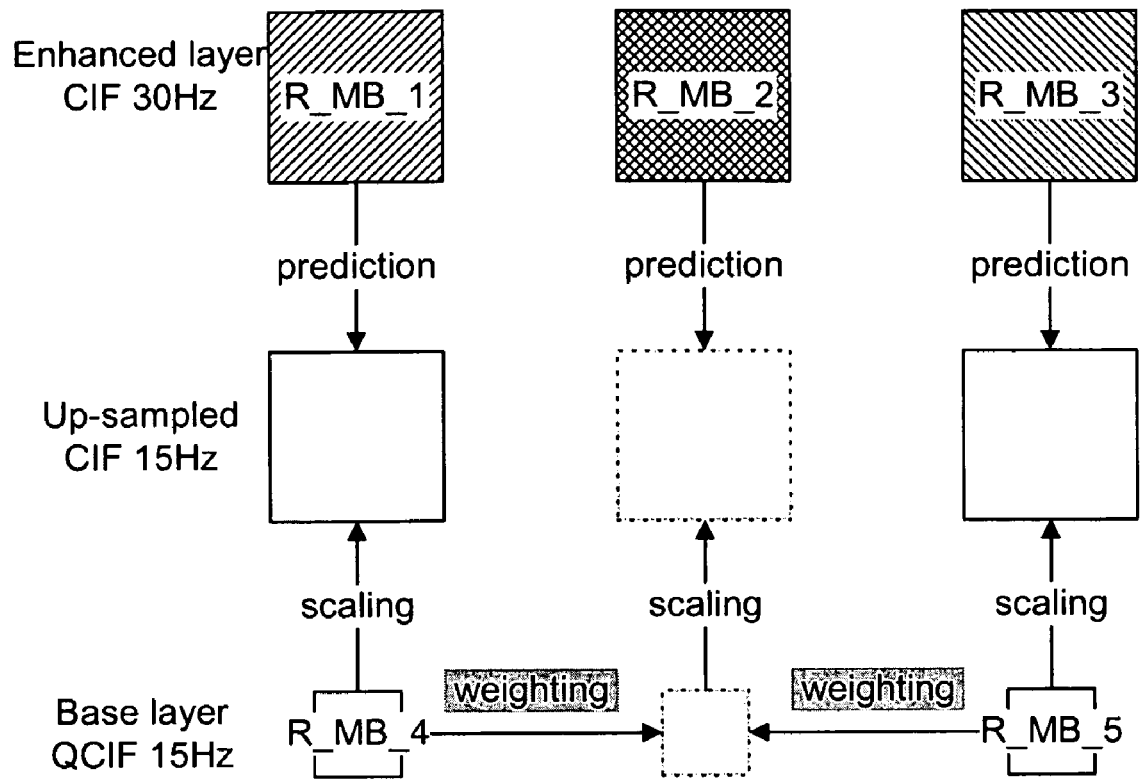
FIG. 4 is a view illustrating a case in which a residual prediction mode is applied to a macro block of an enhanced layer by using a past residual frame and a future residual frame in a base layer of a frame including the macro block of the enhanced layer according to an embodiment of the present invention.

FIG. 4 is a view illustrating a case in which a residual estimation mode is applied to a macro block of an enhanced layer by using a past residual frame and a future residual frame in a base layer of a frame including the macro block of the enhanced layer according to an embodiment of the present invention.

The embodiment shown in FIG. 4 may be employed for a case in which a residual frame temporally simultaneous with a current frame including a residual block R_MB_2 of an enhanced layer does not exist in a base layer. The existence of the simultaneous residual frame in the base layer is determined by determining if a frame having the same picture order count (POC), which is the current frame, exists in the base layer based on the POC informing a picture decoding order from among encoding information extracted from the BL decoder 105.

The residual prediction unit 103 creates an insert residual block of the base layer temporally simultaneous with a residual block of the enhanced layer by weighting pixel values of residual blocks R_MB_4 and R_MB_5 (the residual blocks have the same relative positions in frames), which correspond to the residual block R_MB_2 of the enhanced layer and are included in the past residual frame and the future residual frame of the base layer, using a suitable weight value. Then, the residual prediction unit 103 enlarges the size of the insert residual block of the base layer to the size of the macro block of the enhanced layer by up-sampling the insert residual block.

Herein, the weight values are values between 0 and 1 selected in such a manner that the sum of the two weight values is equal to 1. The weight values may be determined as values proportional to a correlation between a frame including the residual block of the enhanced layer and the past residual frame or the future residual frame. In addition, the weight values may be determined as values inversely proportional to a temporal distance between the frame including the residual block of the enhanced layer and the past residual frame or the future residual frame.

The residual prediction unit 103 subtracts pixel values of the enlarged insert residual block of the base layer from pixel values of the residual block R_MB_2 of the enhanced layer, thereby making new residual data for a corresponding macro block of the enhanced layer, which corresponds to a different value between the residual data.

The residual prediction unit 103 may insert a "residual_prediction_flag" set to, for example, 1 into a header field of the current macro block, so that the decoder can be notified that the residual prediction mode is applied to the current macro block, that is, the current macro block is encoded by using the difference value between the residual data.

In addition, the residual prediction unit 103 inserts a "residual_direction_flag" set to, for example, 1 into the header field of the current macro block, so that it can be indicated that the difference value of residual data for the current macro block is calculated by using the insert residual block of the base layer created based on the corresponding blocks of the past residual frame and the future residual frame of the base layer. The residual prediction unit 103 can insert one of weight values used for creating the insert residual block (e.g., a weight value used when a corresponding residual block of the past residual flame is weighted) into the header field of the current macro block.

Figure 5:
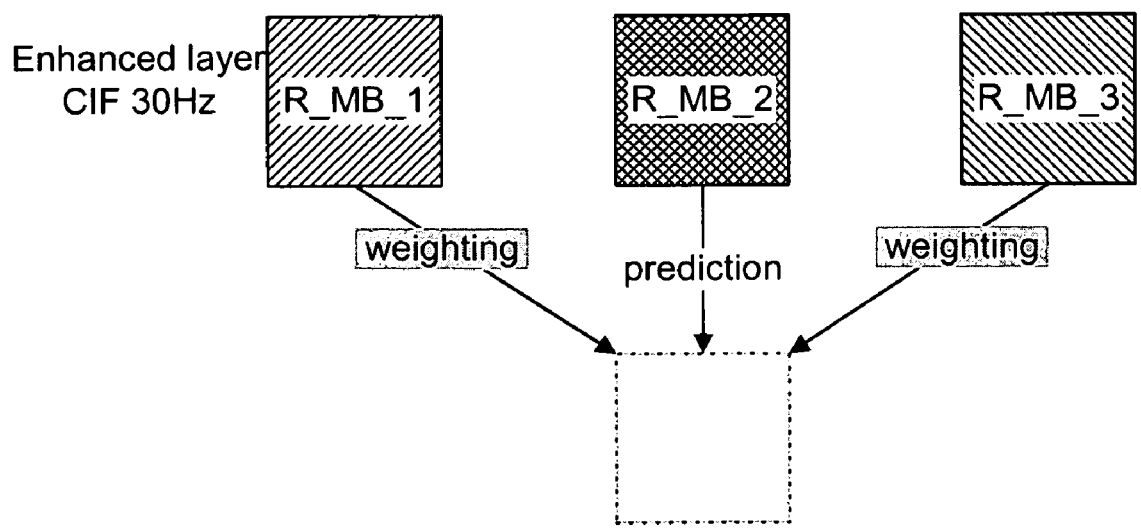
FIG. 5 is a view illustrating a case in which a residual prediction mode is applied to a macro block of an enhanced layer by using a past residual frame and a future frame in an enhanced layer of a frame including the macro block of the enhanced layer according to another embodiment of the present invention.

FIG. 5 is a view illustrating a case in which a residual estimation mode is applied to a macro block of an enhanced layer by using a past residual flame and a future flame ('H' frames) in an enhanced layer with respect to a frame including the macro block of the enhanced layer according to another embodiment of the present invention. The embodiment shown in FIG. 5 can be applied to a case in which a residual frame temporally simultaneous with the frame (a current H frame) including the residual block of the enhanced layer does not exist in the base layer.

The residual prediction unit 103 creates an insert residual block of the enhanced layer temporally simultaneous with the current H frame by weighting suitable weight values to pixel values of the corresponding residual blocks R_MB_1 and R_MB_3 corresponding to the residual block R_MB_2 and included in a past H frame and a future H frame of the current H frame.

Herein, the weight values are values between 0 and 1 selected in such a manner that the sum of the two weight values is equal to 1. The weight values may be determined as values proportional to correlation between the current H frame and the past H frame or the future H frame. In addition, the weight values may be determined as values inversely proportional to a temporal distance between the current H frame and the past H frame or the future H frame.

The residual prediction unit 103 subtracts pixel values of the insert residual block of the enhanced layer from pixel values of the residual block R_MB_2, thereby making new residual data for a corresponding macro block, which is a different value of the residual data.

The residual prediction unit 103 may insert a "residual_prediction_flag" set to, for example, 1 into a header field of the current macro block, so that the decoder can be notified that the residual prediction mode is applied to the current macro block, that is, the current macro block is encoded using the difference value of the residual data.

In addition, the residual prediction unit 103 may insert a "residual_direction_flag" set to, for example, '0' into the header field of the current macro block, so that it can be indicated that the difference value for the current macro block of residual data is calculated by using the insert residual block of the enhanced layer created based on the corresponding blocks of the past frame and the future frame of the enhanced layer. The residual prediction unit 103 can insert one of weight values used for creating the insert residual block of the enhanced layer (e.g., a weight value used when a corresponding residual block of the past residual frame is weighted) into the header field of the current macro block.

Herein, the residual_prediction_flag of '1' indicates that a corresponding macro block is encoded by using difference values between pixel values of a residual block of the enhanced layer for the corresponding macro block and pixel values of i) a corresponding residual block of the base layer temporally simultaneous with the macro block, ii) the insert residual block of the base layer created based on residual blocks of the past frame and the future frame of the base layer as shown in FIG. 4, or iii) the insert residual block of the enhanced layer created based on residual blocks of the past frame and the future frame of the enhanced layer as shown in FIG. 5. In other words, residual_prediction_flag of '1' indicates that the corresponding macro block is encoded by using difference values of residual data.

In contrast, the residual_prediction_flag of '0' indicates that a corresponding macro block is encoded using difference values between pixel values of the corresponding macro block and pixel values of a reference block for the macro block, that is, by using residual data. In other words, this means that only a prediction operation of the estimation/prediction unit 101 is performed, and a prediction operation of the residual prediction unit 103 is not performed with respect to the macro block.

A frame formed by including a macro block encoded based on the new residual data, that is, difference values of residual data is referred to as a '$H^{rd}$' frame in order to be distinguished from the H frame formed only by using a macro block encoded based on residual data.

A data stream encoded through the above-described scheme may perform wire or wireless transmission to the decoder or transmission to the decoder by means of storage medium. The decoder recovers an original video signal according to a scheme to be described below.

Figure 6:
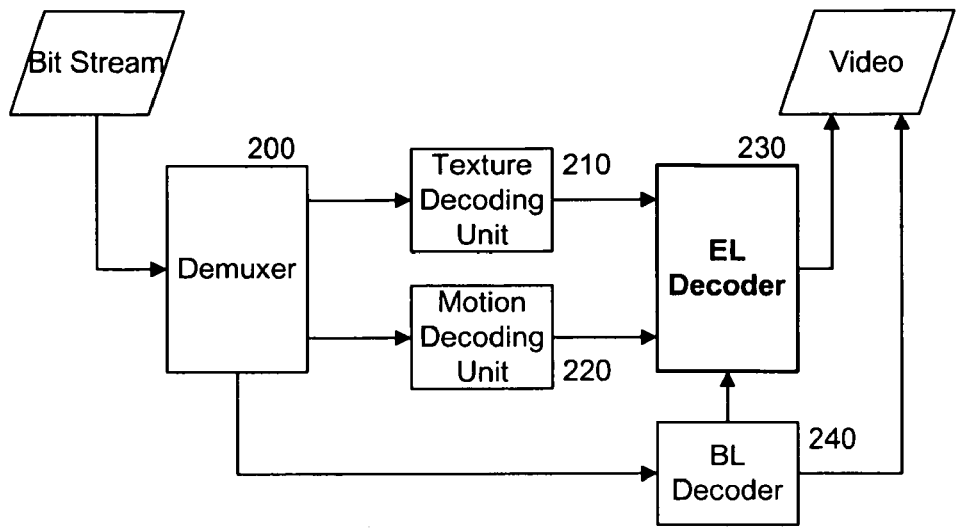
FIG. 6 is a block diagram illustrating the structure of a decoder for decoding a data stream encoded by the device shown in FIG. 2.

FIG. 6 is a block diagram illustrating the structure of the decoder for decoding the data stream encoded by the device shown in FIG. 2. The decoder shown in FIG. 6 includes a de-muxer 200 for dividing the received data stream into a compressed motion vector stream and a compressed macro block information stream, a texture decoding unit 210 for recovering an original uncompressed information stream from the compressed macro block information stream, a motion decoding unit 220 for recovering an original uncompressed stream from a compressed motion vector stream, an enhanced layer (EL) decoder 230 for converting the uncompressed macro block information stream and the motion vector stream into an original video signal through an MCTF scheme, and a base layer (BL) decoder 240 for decoding base layer stream through a predetermined scheme such as the MPEG 4 scheme or the H.264 scheme. The EL decoder 230 uses base layer encoding information such as the POC and base layer data (a macro block or frame data) directly extracted from the base layer stream, or obtained by inquiring the information and the data from the BL decoder 240.

Figure 7:
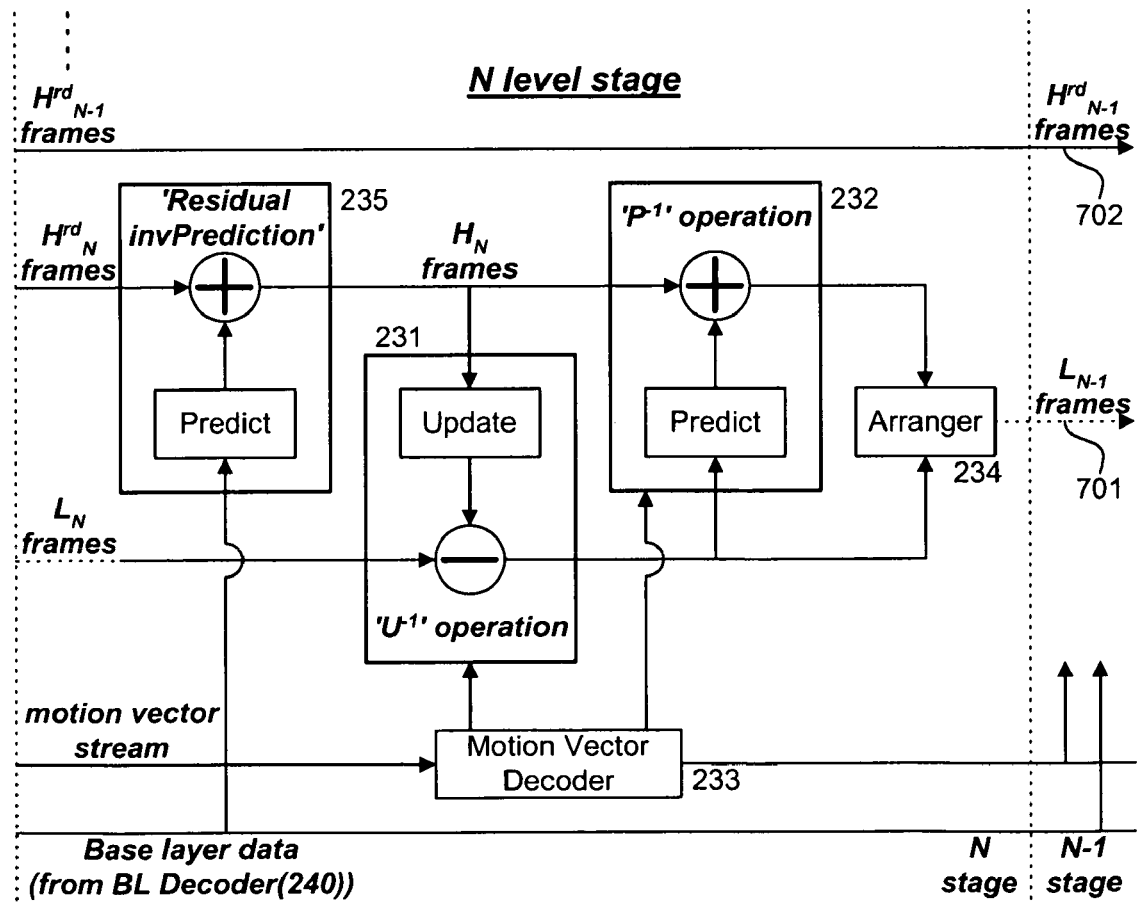
FIG. 7 is a block diagram illustrating the structure of a decoder for executing an MCTF scheme according to one exemplary embodiment of the present invention.

The EL decoder 230 decodes an input stream into data having an original frame sequence, and FIG. 7 is a block diagram illustrating the main structure of the EL decoder 230 employing the MCTF scheme in detail.

FIG. 7 illustrates the structure performing temporal composition with respect to the sequence of the $H^{rd}$ frames (or the H frames) in a temporal decomposition level of N and the sequence of L frames so as to make the sequence of an L frames in a temporal decomposition level of N−1. The structure shown in FIG. 7 includes a residual inverse prediction unit 235 for converting input '$H^{rd}$' frames into H frames having residual data (image differences) by adding pixel values of macro blocks, encoded through a residual prediction operation using difference values of residual data, included in the input '$H^{rd}$' frames to pixel values of residual blocks corresponding to the macro blocks, an inverse update unit 231 for selectively subtracting difference values for pixels of the H frames output from the residual inverse prediction unit 235 from pixel values of input L frames, an inverse prediction unit 232 for recovering L frames having original images using the H frames and L frames obtained by subtracting the image difference values of the H frames from the input L frames, a motion vector decoder 233 for providing motion vector information of each block in the H frames to both the inverse update unit 231 and the inverse prediction unit 232 in each stage or each temporal decomposition level, and an arranger 234 for making a normal L frame sequence by inserting the L frames formed by the inverse prediction unit 232 into the L frames output from the inverse update unit 231.

The L frame sequence output by the arranger 234 becomes the sequence of L frames 701 in a level of N−1 and is restored to the sequence of L frames by an inverse update unit and an inverse prediction unit in a next stage together with the sequence of input $H^{rd}$ frames or input H frames in the level of N−1. This procedure is performed by the number of levels in the encoding procedure, so that the sequence of original video frames is obtained.

Hereinafter, a recovering procedure (a temporal composition procedure) in the level of N of recovering an L frame in the level of N−1 from the received $H^{rd}$ (or the received H frame) in the level of N and the L frame in the level of N having been generated from the level of N+1 will be described in more detail.

If the residual_prediction_flag indicating that a macro block in a predetermined $H^{rd}$ frame is encoded using difference values of residual data is included in the header of the macro block, the residual inverse prediction unit 235 generates residual data for the macro block by using the base layer data and the base layer encoding information extracted from the BL decoder 240 or by using a past frame and a future frame of the $H^{rd}$ frame.

If the macro block in the predetermined $H^{rd}$ frame is encoded using difference values of residual data, the residual inverse prediction unit 235 determines based on a POC of the encoding information extracted by the BL decoder 240 if a frame having the same POC exists in the base layer, thereby determining if a residual frame temporally simultaneous with the $H^{rd}$ frame including the macro block exists in the base layer.

If the simultaneous residual frame exists in the base layer, the residual inverse prediction unit 235 searches for a residual block corresponding to the macro block (the residual block having a relative position identical to that of the macro block in the frame) included in the simultaneous residual frame in the base layer, enlarges the size of the residual block to the size of the macro block by up-sampling the residual block according to necessity, and then adds pixel values of the enlarged corresponding residual block to pixel values of the macro block encoded using the difference values of residual data, thereby creating a macro block having residual data.

In contrast if the simultaneous residual frame does not exist in the base layer, the residual inverse prediction unit 235 determines based on the residual_direction_flag included in the header of the macro block if the encoded difference values of the residual data in the macro block are calculated based on the insert residual block of the base layer or based on the insert residual block of the enhanced layer.

If the residual_direction_flag is set to, for example, 1, that is, if the encoded difference values of the residual data in the macro block are calculated based on the insert residual block of the base layer, the residual inverse prediction unit 235 searches for the corresponding residual block (the residual block has a relative position identical to that of the macro block in the flame), which corresponds to the macro block of the enhanced layer and is included in the past residual frame and the future residual frame of the predetermined $H^{rd}$ frame, from among the base layer data provided from the BL decoder 240. Thereafter, the residual inverse prediction unit 235 creates an insert residual block of the base layer temporally simultaneous with the macro block by weighting the pixel values of the corresponding residual block with a first weight value included in the header for the macro block and a second weight value calculated from the first weight value and then enlarges the size of the insert residual block into the size of the macro block by up-sampling the insert residual block. Thereafter, the residual inverse prediction unit 235 generates residual data for the macro block by adding pixel values of the enlarged insert residual block of the base layer to pixel values of the macro block.

In contrast, if the residual_direction_flag is set to 0, that is, if the encoded difference values of the residual data in the macro block are calculated based on the insert residual block of the enhanced layer, the residual inverse prediction unit 235 searches for a corresponding residual block, which has a relative position identical to that of the macro block in the frame and is included in the past residual frame and the future residual frame of the predetermined $H^{rd}$ frame, creates an insert residual block of the enhanced layer temporally simultaneous with the macro block by weighting the pixel values of the corresponding residual block having residual data based on a first weight value included in the header for the macro block and a second weight value calculated from the first weight value, and then generates residual data for the macro block by adding pixel values of the insert residual block of the enhanced layer to pixel values of the macro block.

Through the above-described procedure, the residual inverse prediction unit 235 performs a residual inverse prediction operation with respect to the macro block encoded using the difference values of residual data so as to be included in an $H^{rd}$ frame, thereby creating an H frame formed only by using residual data, that is, macro blocks having difference values.

In the meantime, with respect to a predetermined L frame (in the level of N), in consideration of a motion vector provided from the motion vector decoder 233, the inverse update unit 231 detects an H frame (in the level of N) having image difference found using a block in an original L frame (in the level of N−1) updated to a predetermined L frame (in the level of N) through the encoding procedure as a reference block and then subtracts image difference values for the macro block in the H flame from pixel values of the corresponding block in the L frame, thereby recovering an original L flame.

The inverse update operation is performed with respect to a block updated using image difference values of a macro block in the H flame through the encoding procedure from among blocks in the current L flame (in the level of N), so that the L flame in the level of L−1 is recovered.

In a macro block in a predetermined H frame, the inverse prediction unit 232 detects a reference block in an L frame (the L flame is inverse-updated and output by the inverse update unit 231) based on the motion vector provided from the motion vector decoder 233 and then adds pixel values of the reference block to difference values of pixels of the macro block, thereby recovering original video data.

If original video data are recovered from all macro blocks in the current H frame through the above described operation, and the macro blocks undergo a composition procedure so that an L frame is recovered, the L frame is alternatively arranged together with an L frame, which is recovered in the inverse update unit 231, through the arranger 234, so that the arranged frame is output to the next stage.

As described above, a perfect video frame sequence is recovered from the encoded data stream. In particular, when one GOP undergoes N prediction operations and N update operations through the encoding procedure in which the MCTF scheme may be employed, if N inverse update operations and N inverse prediction operations are performed in an MCTF decoding procedure, video quality of an original video signal can be obtained. If the operations are performed by the frequency number smaller than N, a video frame may have relatively smaller bit rates even though the video quality of the video flame is degraded somewhat as compared with a video frame through N operations. Accordingly, the decoder is designed to perform the inverse update operation and the inverse prediction operation suitably for the performance of the decoder.

The above-described decoder may be installed in a mobile communication terminal or a device for reproducing record media.

As described above, according to the present invention, when a video signal is scalably encoded, a residual prediction mode is applied for a macro block of an enhanced layer even if a flame temporally simultaneous with a flame of the enhanced layer does not exist in a base layer, thereby improve coding efficiency.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A method of decoding for a video signal, comprising:
   receiving a scalably-encoded video signal corresponding to a base layer and an enhanced layer;
   obtaining a first residual signal of a corresponding block in the base layer, the first residual signal indicating a difference value between a prediction pixel value and a pixel value of the corresponding block;
   obtaining a second residual signal of a current block in the enhanced layer from the first residual signal of the corresponding block of the base layer based on residual prediction identification information, the residual prediction identification information indicating whether a residual signal of the current block in the enhanced layer is predicted from the base layer;
   obtaining first weight information of the current block and a reference index from the corresponding block in the base layer;
   decoding the current block by using the first weight information, the reference index, and the second residual signal,
   wherein the second residual signal is obtained by adding the first residual signal to a third residual signal of the current block extracted from the video signal.

2. The method of claim 1, wherein the first residual signal is temporally simultaneous with the second residual signal.

3. The method of claim 1, wherein the first weight information is the same as second weight information of the corresponding block corresponding to the current block.

4. The method of claim 3, wherein the first weight information is determined based on similarity or temporal distance between frame indicated by the reference index and a frame including the corresponding block.

5. An apparatus for decoding a video signal, comprising:
   a demuxer receiving a scalably-encoded video signal corresponding to a base layer and an enhanced layer;
   a base layer decoder obtaining a first residual signal of a corresponding block in the base layer, the first residual signal indicating a difference value between a prediction pixel value and a pixel value of the corresponding block;
   an enhanced layer decoder obtaining a second residual signal of a current block in the enhanced layer from the first residual signal of the corresponding block in the base layer based on residual prediction identification information, obtaining a first weight information of the current block and a reference index from the corresponding block of the base layer, and decoding the current block by using the first weight information, the reference index, and the second residual signal,
   wherein the residual prediction identification information indicates whether a residual signal of the current block in the enhanced layer is predicted from the base layer, and the second residual signal is obtained by adding the first residual signal to a third residual signal of the current block extracted from the video signal.

6. The apparatus of claim 5, wherein the first weight information is the same as second weight information of the corresponding block corresponding to the current block.

7. The apparatus of claim 6, wherein the first weight information is determined based on similarity or temporal distance between a frame indicated by the reference index and a frame including the corresponding block.

* * * * *